Jan. 13, 1931.  J. T. RIDDLE  1,788,744
SAW FILER'S GAUGE
Filed Dec. 10, 1929
Fig.1
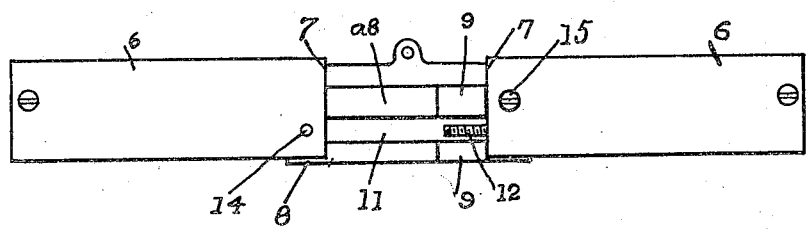
Fig.2
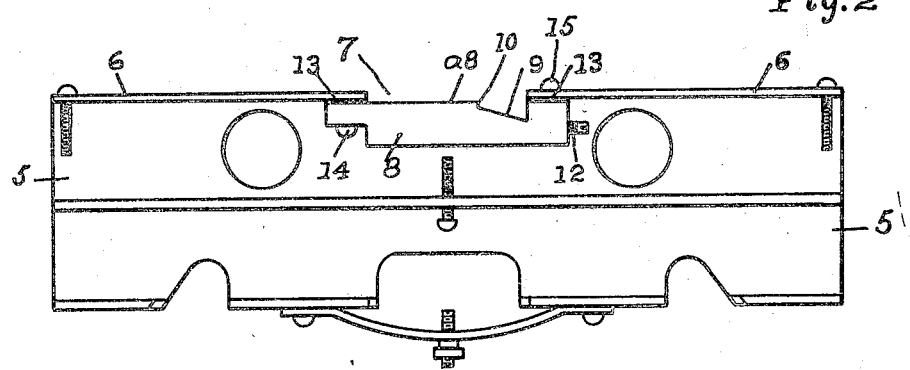
Fig.3
Fig.4
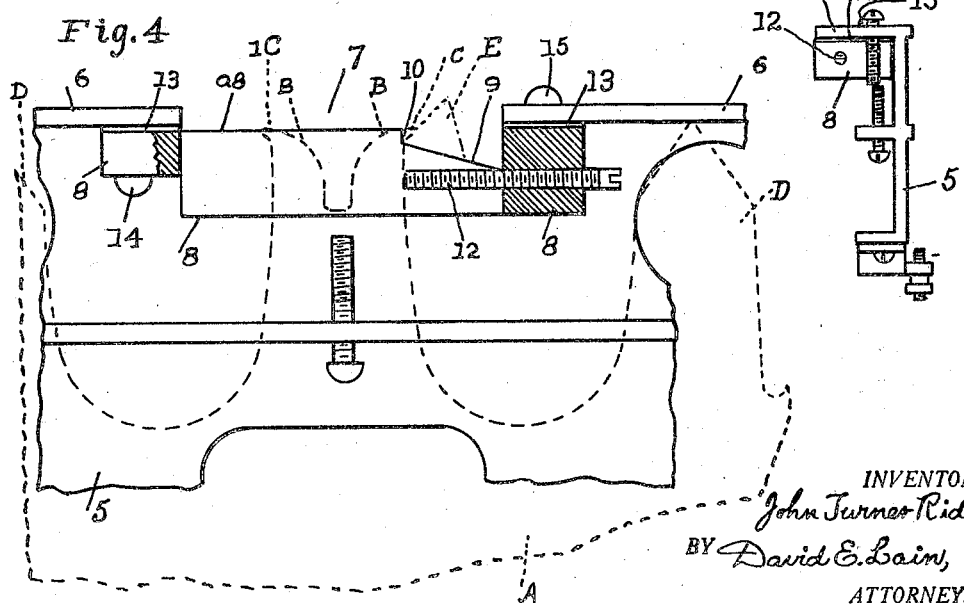
INVENTOR,
John Turner Riddle.
BY David E. Lain,
ATTORNEY.

Patented Jan. 13, 1931

1,788,744

UNITED STATES PATENT OFFICE

JOHN TURNER RIDDLE, OF LAWRENCE TOWNSHIP, WHATCOM COUNTY, WASHINGTON

SAW-FILER'S GAUGE

Application filed December 10, 1929. Serial No. 413,043.

My invention relates to improvements in saw-filer's gauges used when standardizing the shape of saw teeth by filing the same and has for an object to provide a gauge to standardize the bits of the raker teeth of cross-cut saws.

Another object of my improvement is to provide a gauge block suitable for attachment to the ordinary saw-tooth gauge whereto both the outer and inner edges of the bits of raker teeth may quickly be filed to standard shape by filers of ordinary ability.

I attain these and other objects of my improvement with the device illustrated in the accompanying sheet of drawings forming a part of this specification in which Figure 1 is a plan view of an ordinary saw tooth gauge with my gauge block in operative place thereon, Fig. 2 is a front side elevation of Fig. 1, Fig. 3 is an end elevation of Fig. 2 and Fig. 4 is a replica of the central portion of Fig. 2, the remainder of which is broken away, drawn on an enlarged scale.

Similar characters indicate similar parts throughout. Certain parts are broken away to show other parts hidden thereby.

With more particular reference to the designated parts:

In general, the body of the usual saw-tooth gauge is, in shape, an angle bar consisting of web 5 and flange 6. Midway of the length of flange 6 is an opening 7 which also encroaches on the upper part of web 5. Gauge block 8 is fastened to the lower side of flange 6, to bridge opening 7 therein, by screws 14 and 15. Gauge block 8 has perpendicular slot 11 therethrough extending the entire length of opening 7. A transverse notch 9 extends across the upper surface $a8$ of block 8 at the right-hand end of opening 7 having a bottom surface 9 inclined downwardly toward the right and a shallow left-hand wall 10 used as a stop. Stop screw 12 is engageable in a horizontal tapped hole through the right-hand end of block 8 entering slot 11. Block 8 is fastened beneath flange 6 with shims 13 intervening. These shims may be varied in thickness or number and determine the distance between the cutting edge of the raker teeth and the line of the points of the cutting teeth of the saws sharpened to this gauge.

In Fig. 4 a portion of a cross-cut saw A is shown in broken outline in place in my gauge to have a bit C of raker tooth B, B shaped to gauge. Said raker tooth has been extended into slot 11 from below and placed with its right-hand edge against stop screw 12 and the points of its cutting teeth D against the bottom wall of flange 6. Block 8 is preferably made of tempered steel and a file does not engage with and score its surfaces.

Teeth D, it is assumed, have been sharpened, thus reducing their length before the work under description was begun.

Bit 1C of raker tooth B on saw A is shown in dotted outline protruding slightly beyond the top surface $a8$ of block 8. Bit C of said tooth B also had appeared above the gauge block but, it is assumed that it has been reduced to surface therewith by having been filed off till the file bore flatwise on block surface $a8$. Then to finish sharpening and shaping bit C a three-cornered file shown in dotted outline at E is placed flatwise on notch bottom 9 and the inner edge of bit C is filed away while file E bears on the bottom of notch 9 till a corner of said file, E bears on stop wall 10 when said bit C is sharpened and shaped to standard.

In the illustration the surface made by file E is at an angle of 45° with the axis of the tooth because gauge surface 9 is at an angle of 75° with said tooth axis and a cross section of file E is equiangular. If another angularity of the bit be desired, a different angled file or a block with surface 9 at a different angle may be used.

When thus finished, raker bit C is of standard shape.

To properly sharpen and shape bit 1C the saw is turned end for end and raker B, B is again extended through slot 11 and caused to bear against stop screw 12 while the points of the cutting teeth are caused to bear on the lower surface of flange 6. In practice, of course, saw A is held in a vise and the saw gauge is reversed on the saw when changing to gauge a bit facing in the opposite direction.

When thus reset, bit 1C is filed and shaped in the same manner as above described in reference to bit C.

Thus, by the use of my extremely simple gauge the bits of the raker teeth can be brought to a uniformity by an unskilled filer hitherto hardly attained by one most skilled.

The angularity of notch surface 9, the thickness of shims 13 and the angularity of the file used provide ample opportunity to suit my gauge to any requirement of raker bit shape.

It is readily apparent that my gauge block is easily fixed in place on the usual types of saw-tooth gauges.

Having thus disclosed my invention, what I claim as new therein and desire to secure by Letters Patent is,—

A saw-tooth gauge consisting of an angle bar the flange of which has an open space therethrough midway the length thereof, a filer's gauge block fastened adjacent the inner wall of said flange to bridge said open space and having a longitudinal slot therethrough and a transverse notch intersecting said slot in the surface of said block adjacent said flange said notch having a shallow edge wall adapted to stop a file and a downwardly inclined bottom wall adapted to guide a file, shims of suitable thickness intervening to space said block from said flange, said block having a tapped hole in the end thereof and a set screw extended through said hole to be disposed in said slot adjacent said notch to stop a raker tooth.

JOHN TURNER RIDDLE.